Figure 1:
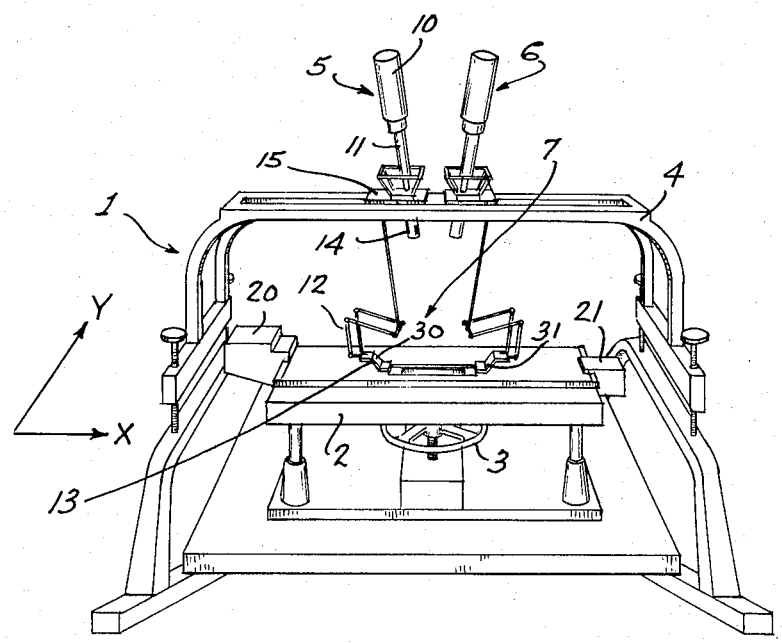

United States Patent
Blachut et al.

[15] 3,692,406
[45] Sept. 19, 1972

[54] RELIEF SHADING APPARATUS

[72] Inventors: Theodore J. Blachut, 29 Cedar Road, Rothwell Heights, Ottawa, Ontario; Zbynek Marsik, 255 Durocher, Apt. 7, Eastview, Ontario; David M. Makow, 14 Davidson Crescent, Ottawa, Ontario, all of Canada

[22] Filed: Sept. 11, 1969

[21] Appl. No.: 857,035

[30] Foreign Application Priority Data

May 16, 1969 Canada...........................51814

[52] U.S. Cl. ............................355/22, 355/52, 356/2
[51] Int. Cl. ..............................................G03b 35/20
[58] Field of Search ........355/40, 18, 22; 353/11, 12, 353/10, 5, 6; 356/2

[56] References Cited

UNITED STATES PATENTS 3,486,820  12/1969  Bladut et al. ..................353/6

Primary Examiner—Samuel S. Matthews
Assistant Examiner—Michael D. Harris
Attorney—Graham & Baker

[57] ABSTRACT

A method and apparatus is described for placing shading on a map representation of a three dimensional surface. The shading is developed by scanning a three dimensional representation of the surface and following the instantaneous height of the part of the representation being scanned. A signal is generated from the rate of change of such height and caused to affect a sensitive surface to place shading on it in those areas which represent the sides of features on the map facing away from a chosen direction of supposed illumination of the surface.

7 Claims, 4 Drawing Figures

RELIEF SHADING APPARATUS

This invention relates to a method and apparatus for introducing shading into maps and which do not involve the interpretation by a draftsman reading the map to determine the direction of slope and whether such shading may or may not be necessary. The method and apparatus can be used in conjunction with any equipment which provides terrain slope information, for example, photogrammetric plotters. They could also be used with conveniently stored terrain information in analogue or digital form. The apparatus can be used most conveniently connected to an ortho-photo plotter. In this way the relief shading can be produced as a byproduct, simultaneously with ortho-photo scanning.

Some aspects of the current state of the ortho-photo technique are described in an article by one of the present inventors, Mr. T. J. Blachut in the Canadian Surveyor, Volume 22, No. 1 for March, 1968.

The ortho-photo technique, basically, is a photographic process in which overlapping aerial photographs of terrain are taken from separated viewpoints, and which photographs are then viewed stereoscopically to present a three-dimensional optical model of the terrain. By bringing all points of the model successively into optical coincidence with a fixed measuring mark, or horizontal plane, the orthogonal coordinates of each terrain feature are derived. The orthogonal coordinates are those which each point subtends on the surface of an imagined flat earth for the area under consideration.

There are several ways in which an ortho-photograph may be produced but one particularly satisfactory technique involves the projection of the images of the two overlapping photographs of the terrain to be mapped to form the stereoscopic model into a space above a table covered with a light sensitive emulsion and which is masked over its entire area, except for one small portion constituting a scanning slit, which is moved at a predetermined rate across the photographic emulsion. Simultaneously with the movement of the slit an operator can alter the height of the table carrying the emulsion to ensure that the area exposed through slit traces out the orthogonal projection of the optical model of the terrain. This process automatically assures that the integrated image which builds up on the photographic emulsion shows all features of the plotted terrain in their rectified or orthogonal positions and being obtained directly from the photographic model shows the features on the map as they appear in natural (or chosen artificial) light and shade or color (if color film is employed). Techniques can be used, in conjunction with the scanning, to mark on the film, contour points at chosen intervals, which points are immediately known from the position of the screw adjusting the height of the table.

The presentation and utility of the ortho-photographic map can be greatly improved by the addition of shading to those parts of elevated features, which fall on the opposite side, to the direction of an imagined source of illumination for the model. Thus although aerial photographs themselves are in general illuminated from the South in the Northern Hemisphere and from the North in the Southern Hemisphere, except where the photographs have been taken at night using flash techniques, conventionally, the reading of a map and other drawings calls for the light to appear to come from the top left hand corner of the document, i.e., from the Northwest direction for a conventially oriented map. Shadow effects occuring in the original photographs can be removed in the mapping technique by employing a photoelectric cell which continually monitors the amount of light falling on the slit, and which alters by a small amount the preset scanning rate for the slit, to vary the exposure given to the emulsion on the table. For good viewing of the ortho-photo map, shading is then added, conventionally, by hand by a draftsman interpreting the map.

The present invention makes possible an automatic method for shading maps and avoids the need for any interpretation by a draftsman, and consequent possible human error.

In accordance with one aspect of the invention there is provided, a method of shading an image representing a three dimensional featured surface which comprises scanning a representation of the featured surface (this may comprise, for example, an optical model of the featured surface, direct coordinate information available from a plotter, or even a computer presentation of a stored information representing the coordinates of a model of the featured surface), following the instantaneous height of that part of the representation being scanned (in an optical model this would be a measuring mark moved over the surface of the model as it is being scanned, or might be any other presentation of the height co-ordinates of the horizontal coordinates of the model or representation being delivered by the scanning system), scanning a sensitive surface in correspondence with the first mentioned scanning (this surface may for instance be a photographic emulsion, or for instance heat-, electric-, or pressure sensitive material) and affecting the sensitive surface in an intensity proportional to the rate of change of the instantaneous height. Preferably the sensitive surface is a photographic emulsion which is affected by illumination fed through a scanning slit.

In accordance with another aspect of the invention there is provided, apparatus for shading an image representing a three dimensional featured surface which comprises, first means for scanning a representation of the featured surface (this representation may, for example, be an optical model or other machine presentation of the coordinates of a representation of the featured surface), means for deriving the instantaneous height of the representation being scanned (this may, for example, be the position of a measuring mark following an optical model, or the correlated height coordinates presented by a plotter or computer), a sensitive surface (this is preferably a photographic emulsion but may be a surface covered with any sensitive substance, such as heat-, electric-, pressure-, or other responsive material), means for scanning the sensitive surface in correspondence with the first scanning means, means for affecting the sensitive surface, and means for connecting the sensitive surface affecting means and the height deriving means, in a sense to affect the sensitive surface in an intensity in accordance with the rate of change of the instantaneous height. When the sensitive surface is a photographic emulsion, means are provided for illuminating the emulsion as it is scanned in an intensity proportional to the rate of movement of the index in the vertical direction.

Figure 2:
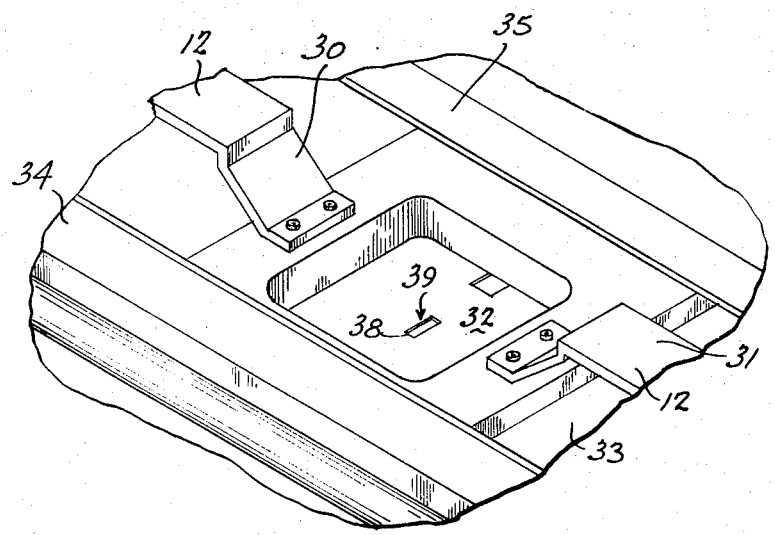
Figure 3:
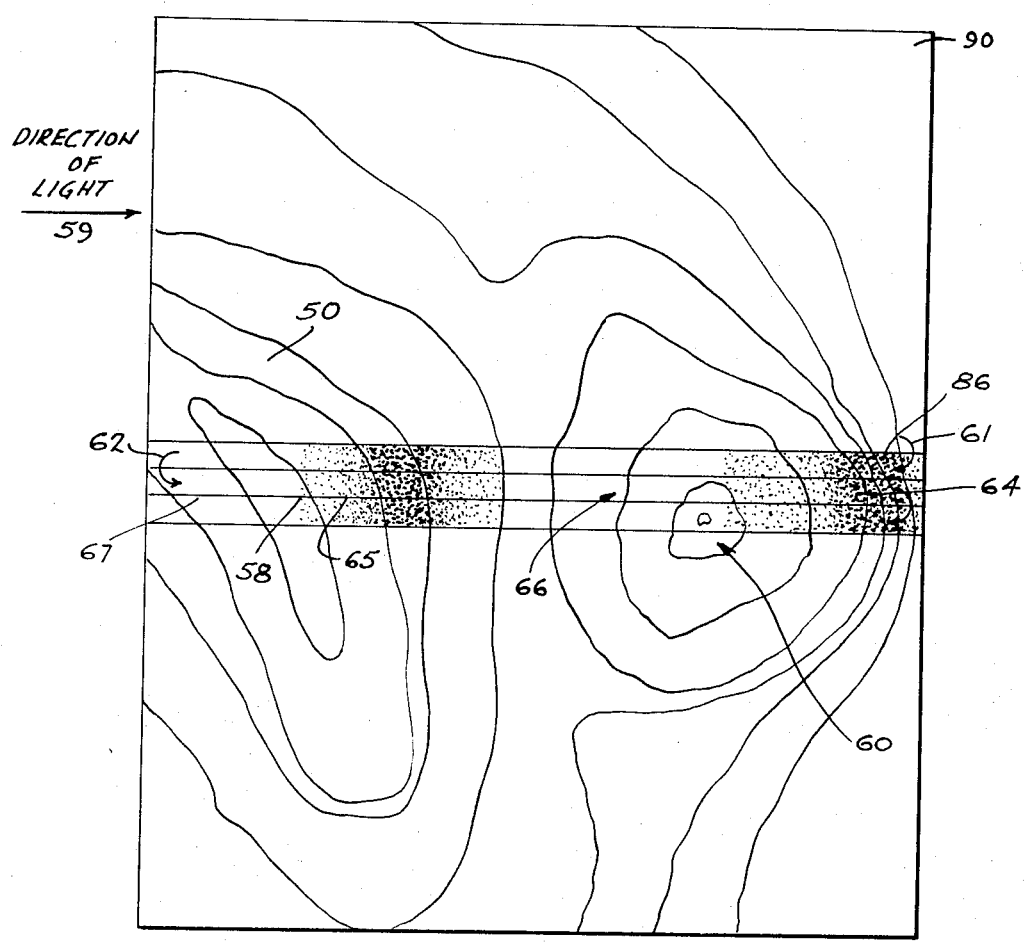
Figure 4:
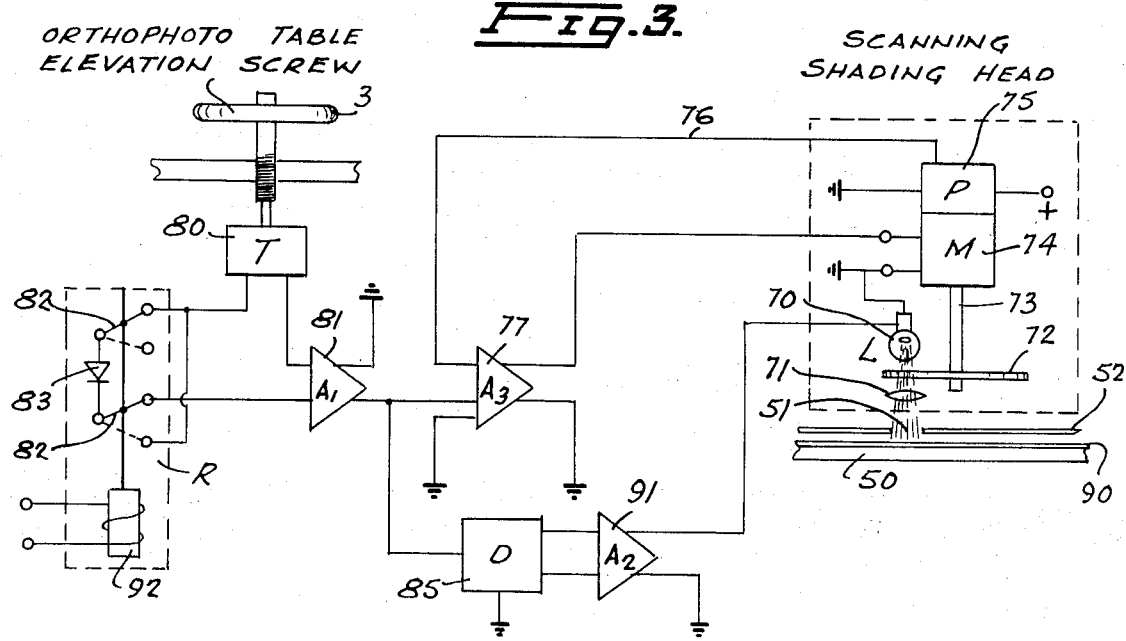

In the description which follows reference will be made to the accompanying drawings in which FIG. 1 shows a side view of ortho-photographic plotter before modification to include the invention, FIG. 2 shows an enlarged view of the area of the slit through which the ortho-photograph is exposed in FIG. 1, FIG. 3 shows a typical shading scanning process for an ortho-photo; and FIG. 4 shows a schematic diagram of the circuitry for driving an additional shading head in accordance with the invention.

Having a reference now to FIG. 1, a plotter 1 comprises table 2 mounted for vertical movement by means of hand wheel 3, an overhead supporting beam 4 carries a pair of projector assemblies 5 and 6 for two overlapping terrain photographs which can project a stereoscopic image of the terrain into the volume shown generally at 7. Each projector, illustrated for example by means of projector 5, includes a source 10 providing a beam of parallel light carried on an arm 11 which is linked by means of a pantograph 12 to the slit scanning assembly 13. The arm 11 also carries lens assembly 14 which brings the light emanating from photograph 15 to a focus in the region occupied by the optical model of the terrain. The slit, described in more detail in FIG. 2, is scanned in the X-direction by means of motor 20 and in Y-direction by motor 21.

Referring now to FIG. 2 the pantographs 12 for the two projectors 5 and 6 terminate at their lower ends at 30 and 31 respectively so that the optic axes of the projector assemblies 5 and 6 always intersect in the region of the white plate 32. The plate 32 completely masks an underlying photographic emulsion and at the edges of the plate the masking is continued by means of flexible rubber sheet 33. Motor 20 (See FIG. 1) drives the plate 32 in the X-direction by means of a lead screw (not shown) with respect to the guide rails 34 and 35. Rails 34 and 35 are driven across the table 2 in the Y-direction by a lead screw operated by motor 21. The plate 32 is perforated in its central region by a slit or sampling aperture 38 beneath which the photographic emulsion 39 is visible. The motors 20 and 21 are driven at a predetermined rate and provide information in digital form to give a continuous record of the position of the slit 38.

Let us assume now that an ortho-photo is being produced by the scanning technique mentioned earlier, on a second table 50 similar to table 2 there is another sheet with sensitive photographic emulsion 90 shown in FIG. 4. The photographic emulsion 90 is screened from the entry of light by means of flexible sheet 52 similar to sheet 33. If now the scanning of the optical model is carried out as described, the slit 51, being remotely controlled by the information derived from motors 20 and 21, will move in unison with slit 38 over the emulsion 90.

In FIG. 3 an example of the situation in progress is shown. A small section of the ortho-photo can be imagined to have a hill at 58 and 60, and let it be assumed that the slit is moved in the manner shown by arrows 61 and 62 so that the scan passes first from left to right then from right to left, subsequently left to right, etc. Let us assume too for the sake of argument that the light is to come from the left hand side of the picture in the direction of the arrow 59. As the photographic emulsion 90 is scanned we wish to provide shading in the area 64 and 65 but none in the areas 66 and 67. This may be achieved by using the apparatus shown in FIG. 4.

Above the slit 51 is mounted a lamp 70 whose light is directed by lens 71 onto the emulsion 90 beneath the slit 51. Between the lamp 70 and the emulsion 90 a shading disc 72 is inserted, mounted on a shaft 73 for rotation through about 360°, and whose position is controlled by servo-motor 74 and monitored by a potentiometer 75. The intensity of light passing from the lamp 70 to the emulsion 90 varies continuously as the disc 72 is rotated from one end of its travel to the other, the disc being transparent at one end and effectively opaque at the other. The tachometer 80 is connected to the wheel 3 of the table 2 and gives a voltage which is proportional to the rate of rotation of the wheel 3. The motor 74 is driven from a differential (amplified in amplifier 81) and the potentiometer 75 output.

The output of tachometer 80 is applied to amplifier 81, by means of reversing switch 82, through diode 83. In the position of switch 82 shown in FIG. 4, we will assume that the slit 51 is in the region 86 of FIG. 3 when the table 2 is being raised to follow the upslope of hill 60, and that the output of tachometer 80 is in the forward direction for diode 83. The output from tachometer 80 will vary in magnitude with the rate of rotation of wheel 3, and this is applied to the servo system consisting of amplifier 77, motor 74 and feedback loop 75 and 76. The angle of rotation taken up by the disc 72 and therefore its transmission of light from lamp 70 is directly proportional to the rate of rotation of wheel 3, thus, the light passing through the slit 51 is directly proportional to the amount of shadow to be placed in the region 86. When the scanning slit reaches the region 66 the rotation of wheel 3 will stop and then its sense will start to reverse, but the diode 83 will be non-conducting and no signal will be passed to the amplifier 81 and therefore the motor 74 will remain with the disc 72 in its initial position of rest, that is, with no transmission of light through the slit 51. When the slit reaches the area 65 the wheel 3 will stop and then start to turn in its original direction once more. Diode 83 will conduct and the disc 72 will take up a position again dependent on the rate of rotation of the wheel 3 and shading will be produced in the emulsion 90 from the light passing through the slit 51.

When the scanning slit reaches the area 62 its direction of movement reverses and at this point it becomes necessary to alternate the reversing switch 82 by means of the solenoid 92, this reverses the connections to the tachometer 80 so that shading will again occur in regions 65 and 64 even though the sense of rotation of wheel 3 in these areas is the opposite to that previously because of the direction of movement of the scanning slit.

In this way the shading is built up for the whole area corresponding to the ortho photograph in emulsion 39, and the shading in emulsion 90 may be superimposed on the ortho-photo 39 to obtain the map in final form. If desired an ortho-photo need not be produced and the shading may be superimposed on some other presentation of the optical model for example, the shading may be superimposed on a line drawn map.

Although the description has considered an emulsion 90 different from that at 39, it will be understood that the shading might be applied directly to the latent image of the ortho-photo 39, by using the emulsion 39 in the apparatus of FIG. 4.

The operation of this apparatus may be enhanced by obtaining a signal proportional to the first derivative of the output signal from amplifier 81 by means of differentiating circuit 85. The lamp 70 is supplied by an amplifier 91 receiving the input signal from circuit 91, its brightness will thus depend in addition on the rate of change of rotation of tachometer 80, and thus additional shading on steep slopes will be introduced above that which would be obtained if the lamp 70 were constantly illuminated.

It will be understood that the first derivative signal obtained from amplifier 91 might be applied to amplifier 77 instead as an additive quantity to the signal coming from amplifier 81 so as to increase the amount of rotation of the disc 72 with similar effects on shading of steep slopes.

If the direction of illumination is not to be parallel to the edge of the map, it is perfectly feasible to arrange for any direction or angle of movement of the slit with respect to the edge of the map, merely by programming the inputs to the motors 20 and 21 driving the slit 38 and therefore, also to those driving the slit 51, to scan in any desired direction across the emulsion 39 and 90. Thus movement of the slit in the direction from left hand top to right hand bottom corner, and reverse, is obtained by feeding +X and −Y signals to the driving motors for one direction of movement of the slit and −X and +Y signals for the reverse movement. The operation of the device of FIG. 4 remains the same. In this instance reversing of solenoid 92 can be controlled by the polarity of the Y or the X signal, which ever is the more convenient.

If, however, the direction of illumination giving the shading effect is not to be parallel to the orthophoto scanning profiles, then a control unit, such as a small computer, may be introduced between the ortho orthophoto plotter 1 and the shading device of FIG. 4. The control unit stores model X and Y coordinate and height data (transmitted from the orthophoto plotter table 2). It then computes the steepness and direction of the terrain slope; determines, according to his slope, the light intensity needed for shading and commands the lamp 70 and disc 72 in accordance with the scanning movement of the printing head carrying the shading slit 51. The technique of the shading is then the same as before.

The proposed shading device in FIG. 4 can be coupled not only with the plotter of FIG. 1, but with any other photogrammetric plotter or system of instruments no matter whether the basic principle of operation of the system is optical or electronic, or whether the apparatus is manually operated or automatic. The device in FIG. 4 performs the shading in the same manner as described. It will be appreciated too that in some circumstances the shaded representation may be developed on other than photographic emulsion, thus the shading might be printed out on a heat, resistive or electric current, sensitive paper by known techniques, the lamp 70 and disc 72 and the drive to them being replaced by the corresponding scanning heads using such techniques.

We claim:

1. In combination with apparatus for the production of an orthographic image of a three dimensional featured surface which includes means for providing a three dimensional representation of the featured surface, an index means, means for continuously producing a scanning movement of said index means in a datum plane across said representation, means for continuously moving said index perpendicularly to said datum plane into conjunction with the surface of said representation, the vertical separation of said datum plane and said index being representative of the height of the surface of said representation at the conjunction and means for deriving said orthographic image from said representation, the improvement comprising:

apparatus for providing shading for application to said orthographic image which comprises, means for supporting a material having a sensitive surface, exposure means for said sensitive surface for exposing that part of said sensitive surface adjacent to said exposure means, said surface being shadable upon exposure to said exposure means, means for continuously moving said exposure means in a scanning movement across said sensitive surface, at a rate proportional to the first mentioned scanning movement of said index, means connected to said perpendicular moving means for said index for generating an output proportional to the rate of change of vertical position of said index, and means connecting said output generating means to said exposure means for exposing said sensitive surface for shading said surface in an intensity which varies in accordance with said output.

2. Apparatus as defined in claim 1 said representation comprising a three dimensional optical model, and means for forming said optical model in a chosen space, said index being scanned through said space by relative movement between said model and said index.

3. Apparatus as defined in claim 2, said sensitive surface comprising a photographic emulsion, means shielding said emulsion from light, said exposure means comprising transparent slit means for scanning across the emulsion, and means for passing illumination through said slit in accordance with the output of said generation means.

4. Apparatus as defined in claim 3 comprising, screw drive means for vertical movement of said index, a tachometer on said screw drive means deriving a voltage signal proportional to the rate of turning of said screw drive, means for varying the intensity of said illumination in accordance with said voltage signal, and means for interrupting said signal when the signal is of such polarity to represent scanning across a side of an image feature on said model not intended to shaded.

5. Apparatus as defined in claim 4 comprising means for deriving the first derivative signal of the tachometer voltage signal, and means feeding said first derivative signal to said illumination means in a sense to increase said illumination as said first derivative increases.

6. Apparatus as defined in claim 4 said illuminating means comprising, a lamp and a shading disc interposed between said lamp and said emulsion, said disc being a light opacity wedge wherein rotation of said disc progressively decreases the amount of light transmitted from said lamp to said emulsion, and means for positioning said disc in accordance with the signal from said tachometer.

7. Apparatus as defined in claim 6 said disc positioning means comprising a servo-motor, an amplifier and a servo-motor feedback loop, said motor being connected to the disc.

* * * * *

UNITED STATES PATENT OFFICE
CERTIFICATE OF CORRECTION

Patent No. 3,692,406           Dated September 19, 1972

Inventor(s) Theodore J. BLACHUT, et al

It is certified that error appears in the above-identified patent and that said Letters Patent are hereby corrected as shown below:

In the heading, please add:

-- [73] Assignee: Canadian Patents and Development Limited, Ottawa, Ontario, Canada --

Signed and sealed this 22nd day of May 1973.

(SEAL)
Attest:

EDWARD M. FLETCHER, JR.
Attesting Officer

ROBERT GOTTSCHALK
Commissioner of Patents